US012749692B2

(12) United States Patent
Lee

(10) Patent No.: US 12,749,692 B2
(45) Date of Patent: Sep. 29, 2026

(54) SYSTEM AND METHOD FOR CONTROLLING FUEL CELL

(71) Applicants: HYUNDAI MOTOR COMPANY, Seoul (KR); Kia Corporation, Seoul (KR)

(72) Inventor: Yong Hee Lee, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 890 days.

(21) Appl. No.: 18/089,164

(22) Filed: Dec. 27, 2022

(65) Prior Publication Data

US 2023/0402630 A1 Dec. 14, 2023

(30) Foreign Application Priority Data

May 20, 2022 (KR) ........................ 10-2022-0061856
Jun. 17, 2022 (KR) ........................ 10-2022-0074080

(51) Int. Cl.

*H01M 8/04223* (2016.01)
*H01M 8/04746* (2016.01)
*H01M 8/04858* (2016.01)
*H01M 8/04992* (2016.01)

(52) U.S. Cl.

CPC ... *H01M 8/04231* (2013.01); *H01M 8/04753* (2013.01); *H01M 8/04902* (2013.01); *H01M 8/04992* (2013.01); *H01M 2250/20* (2013.01)

(58) Field of Classification Search

CPC ......... H01M 8/04231; H01M 8/04902; H01M 8/0491; H01M 8/04582; H01M 8/04589; H01M 8/04992

See application file for complete search history.

(56) References Cited

U.S. PATENT DOCUMENTS

2016/0079620 A1* 3/2016 Son .................. H01M 8/04365 429/444

FOREIGN PATENT DOCUMENTS

| | | | |
|---|---|---|---|
| JP | 2013-246935 A | | 12/2013 |
| KR | 10-1567238 B1 | | 11/2015 |
| KR | 101616201 | * | 4/2016 |

OTHER PUBLICATIONS

KR101616201 English translation. Lee et al. Korea. Apr. 28, 2016. (Year: 2016).*

Office Action issued in corresponding Korean Patent Application No. 10-2022-0061856 issued on Jun. 25, 2026, with English translation.

Office Action issued in corresponding Korean Patent Application No. 10-2022-0074080 issued on Jun. 25, 2026, with English translation.

* cited by examiner

*Primary Examiner* — Christopher P Domone

(74) *Attorney, Agent, or Firm* — MORGAN, LEWIS & BOCKIUS LLP

(57) ABSTRACT

A system and a method for controlling a fuel cell according to an embodiment are disclosed. The system for controlling a fuel cell includes a fuel cell, a hydrogen purge valve connected between the fuel cell and a hydrogen tank and configured to supply or cut off hydrogen to the fuel cell, and a controller configured to adjust an opening degree of the hydrogen purge valve based on an accumulated current value of the fuel cell calculated in advance and control a flow rate of the hydrogen.

18 Claims, 10 Drawing Sheets

[FIG. 1]
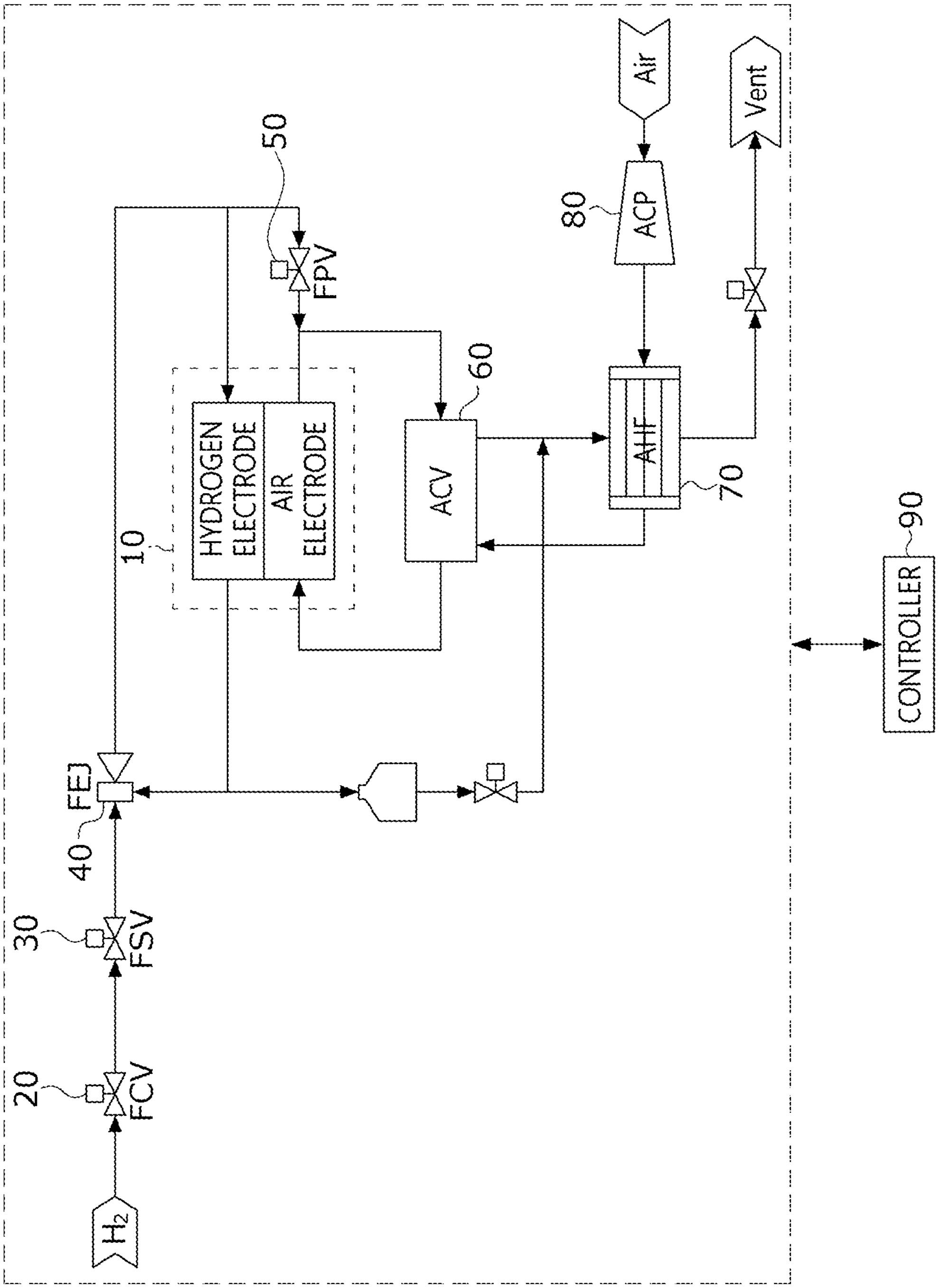

[FIG. 2]
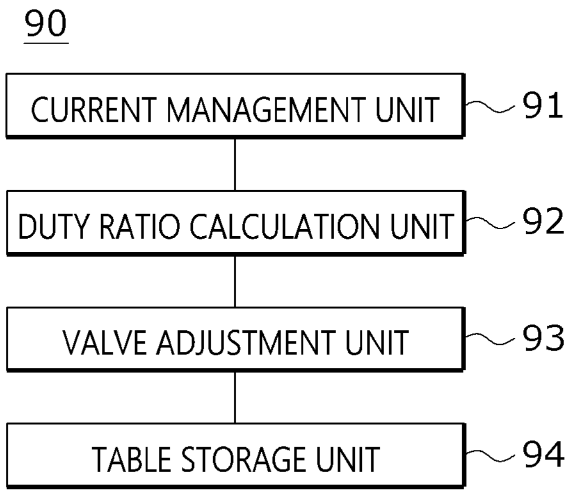
[FIG. 3]
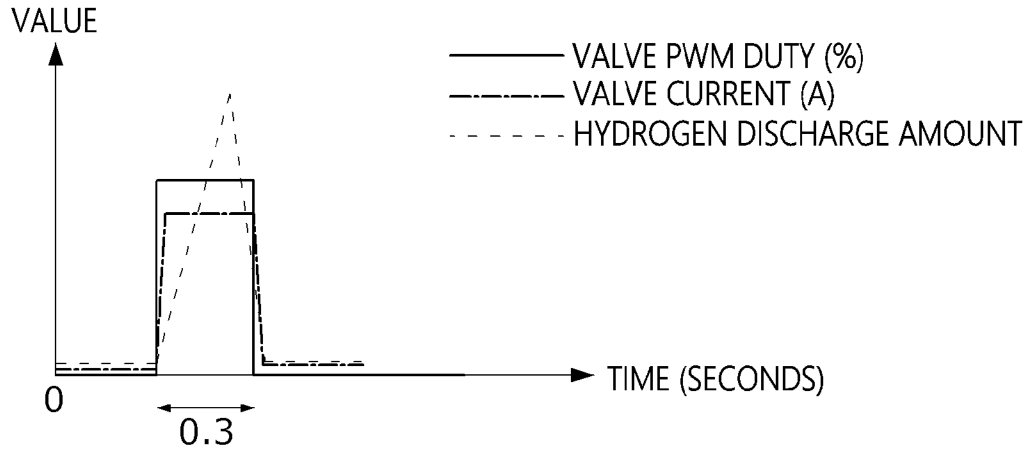

[FIG. 4A]
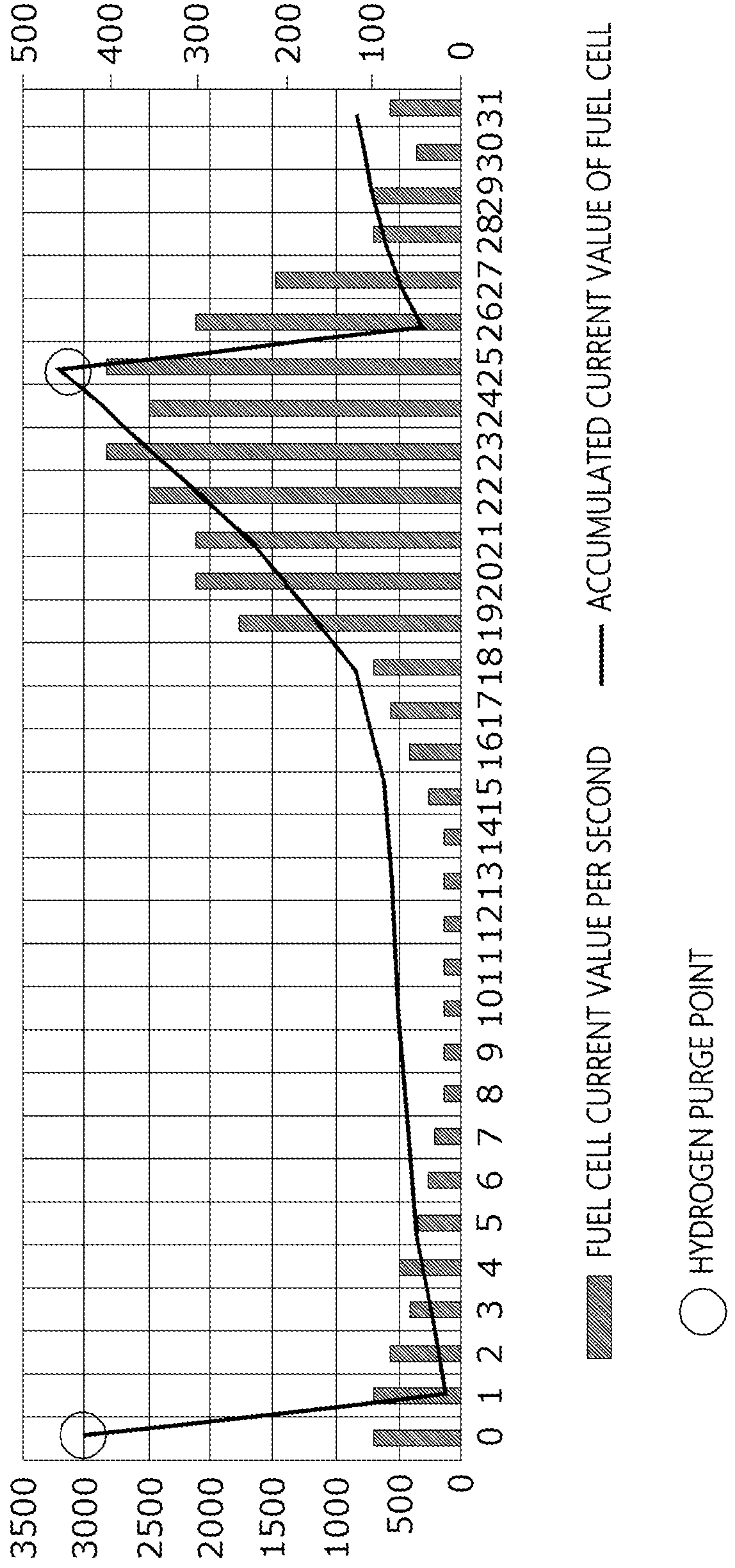

[FIG. 4B]
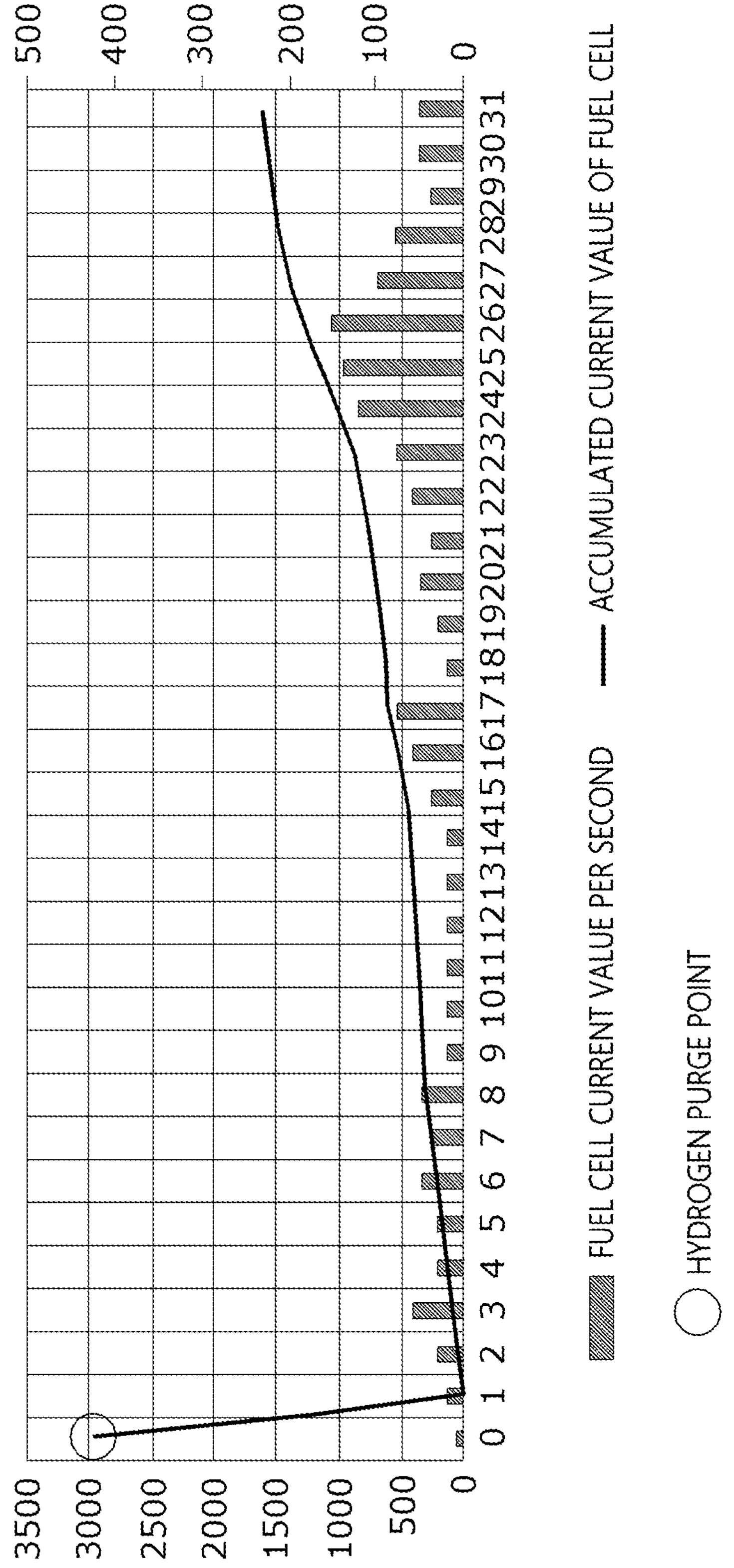

[FIG. 5]
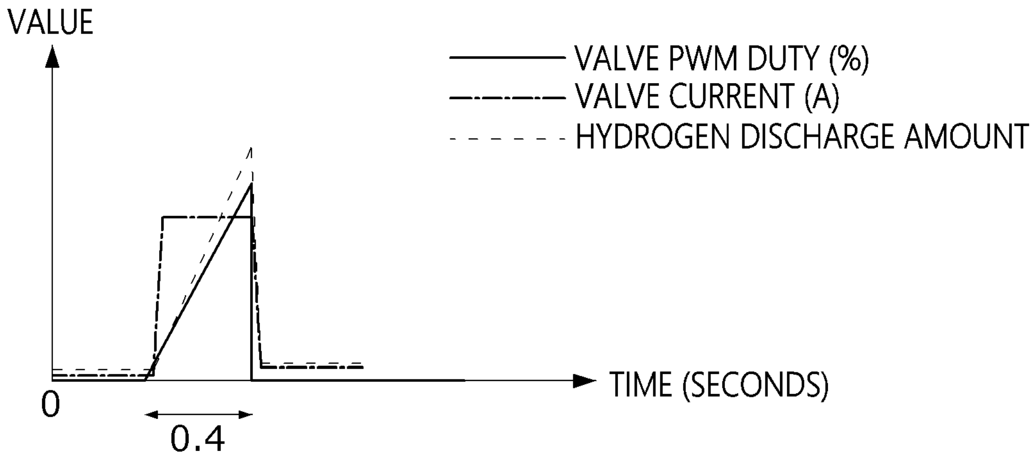
[FIG. 6]
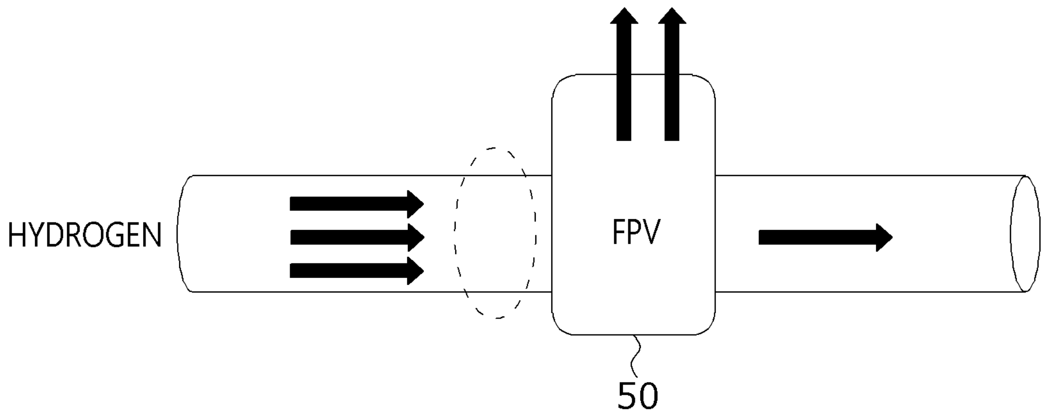

[FIG. 7]
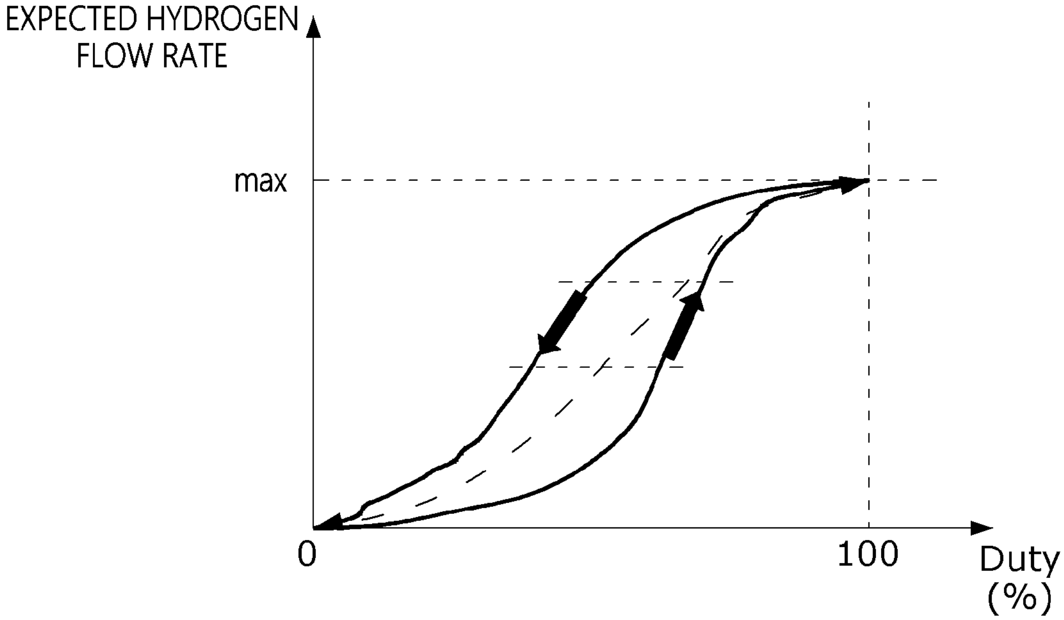

[FIG. 8]
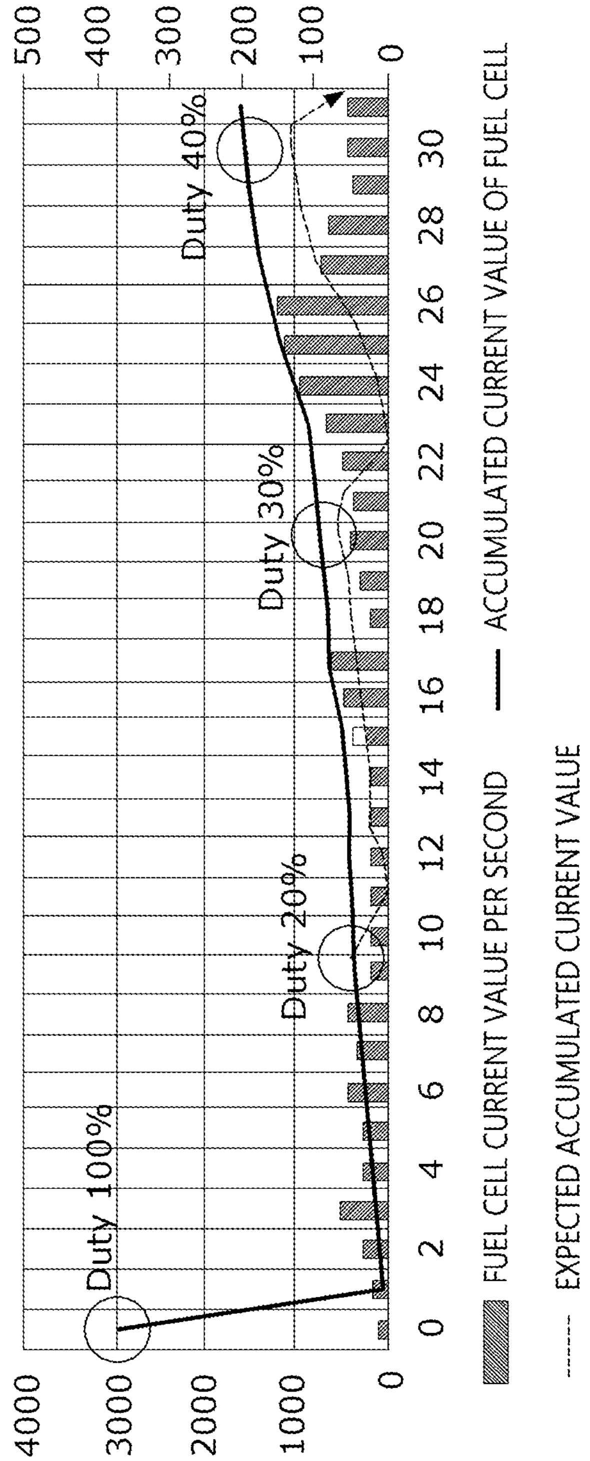

[FIG. 9]
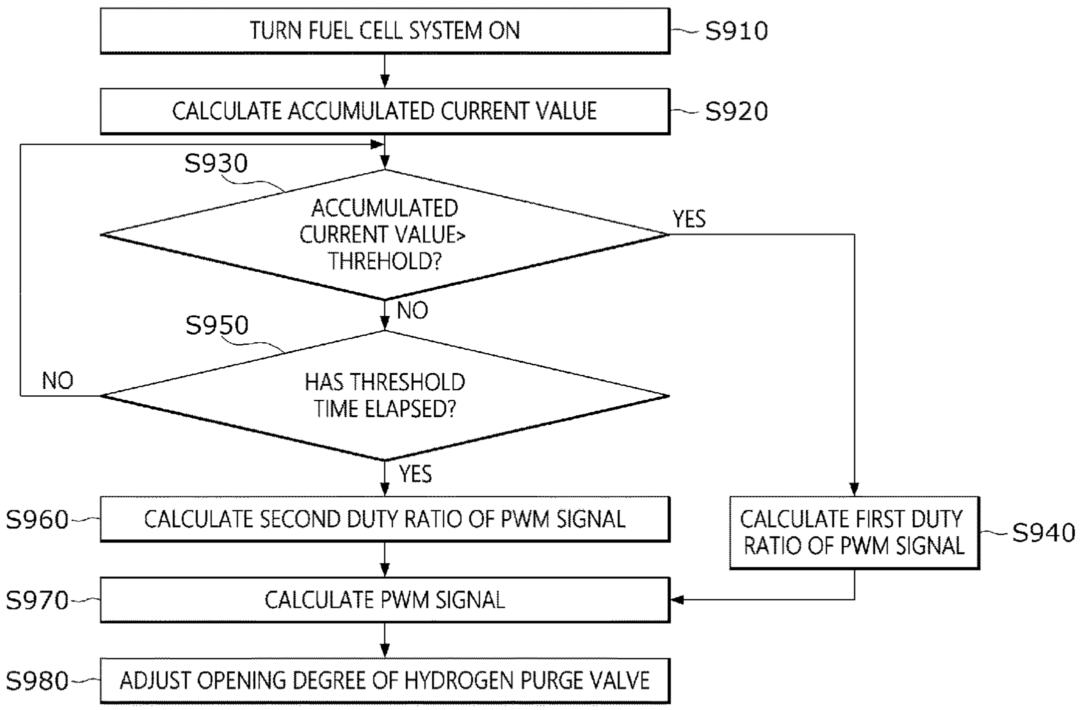
[FIG. 10]
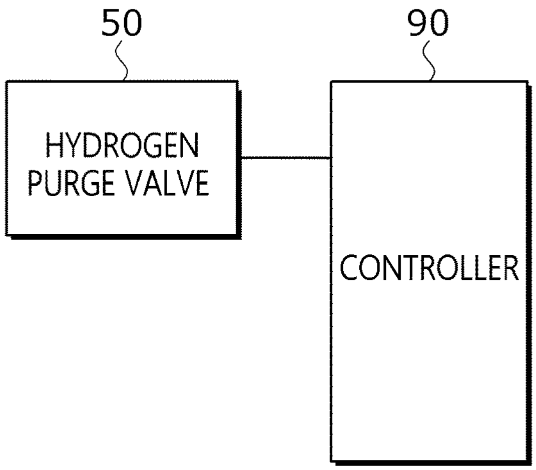

[FIG. 11]
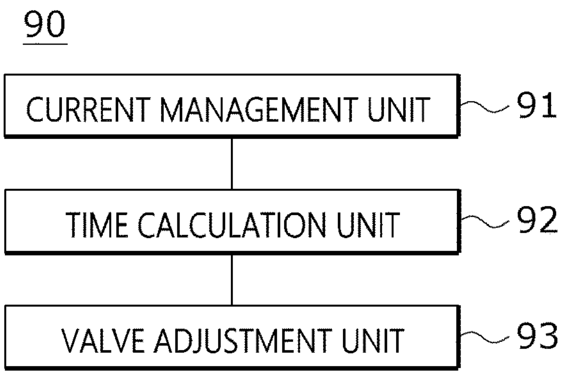
[FIG. 12]
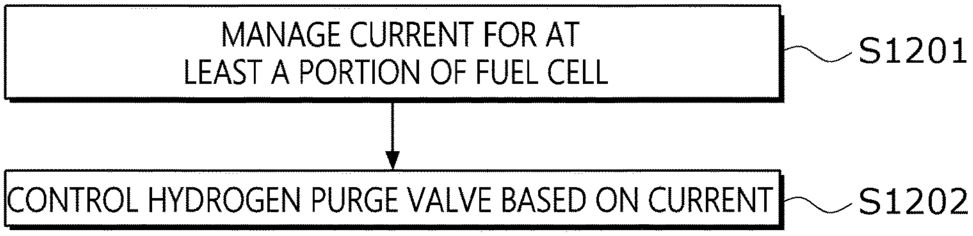
[FIG. 13]
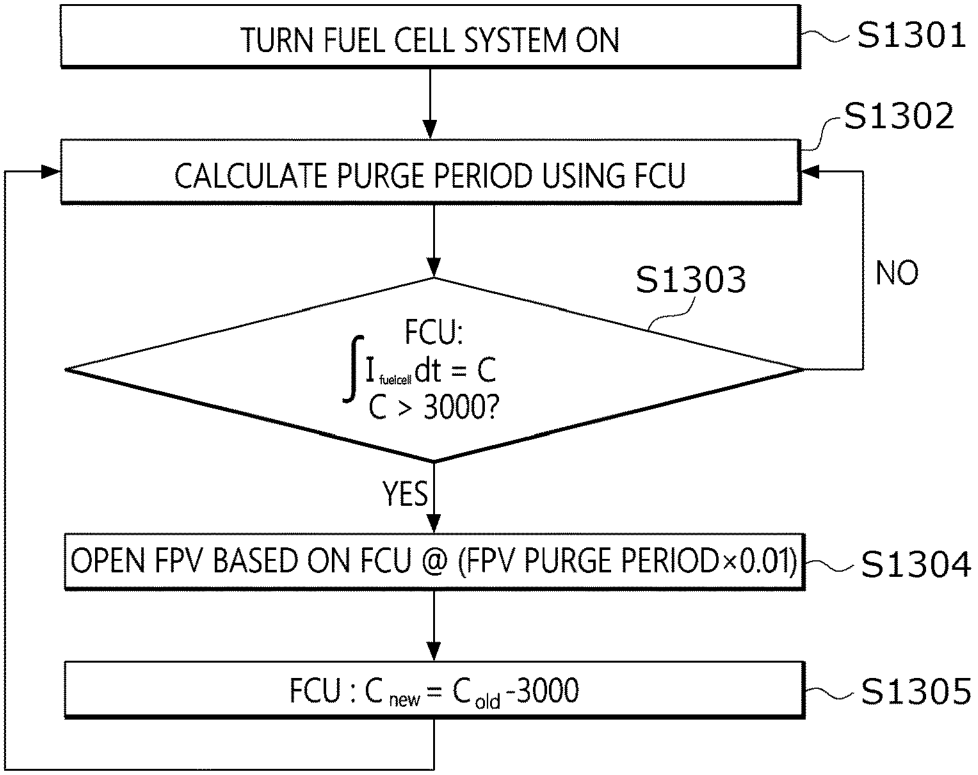

[FIG. 14]
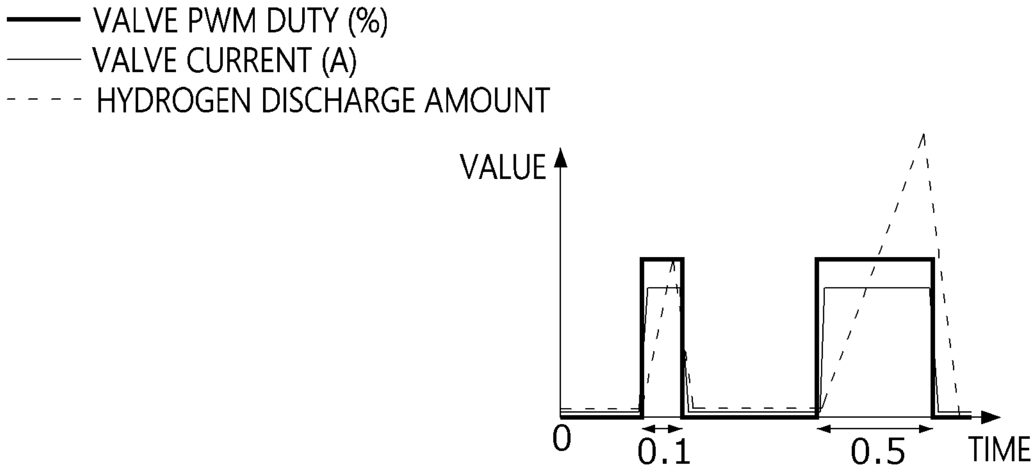

SYSTEM AND METHOD FOR CONTROLLING FUEL CELL

CROSS-REFERENCE TO RELATED APPLICATION

This application claims priority to and the benefit of Korean Patent Application No. 10-2022-0061856, filed on May 20, 2022 and Korean Patent Application No. 10-2022-0074080, filed on Jun. 17, 2022, the disclosure of which is incorporated herein by reference in its entirety.

BACKGROUND

1. Field of the Invention

Embodiments relate to a system and a method for controlling a fuel cell.

2. Discussion of Related Art

Fuel cell systems may directly convert chemical reaction energy between oxygen or oxygen-containing air and hydrogen contained in hydrocarbon-based materials such as methanol into electrical energy to supply the electrical energy to an external load or may be power generation systems for charging an auxiliary battery, which may include a fuel cell and an auxiliary battery.

Fuel cells use hydrogen as a fuel to be used as an alternative power source for vehicles and the like and thus have a wide application range.

However, current methods of controlling a fuel cell system cause various problems for fuel cell components and thus have a limit in use. Therefore, there is a need for a method of solving this problem.

In this case, in the case of a hydrogen purge at a fuel electrode in a conventional fuel cell system for a vehicle, when a hydrogen purge command is received a solenoid valve is opened for a certain time to discharge hydrogen.

However, in a situation in which a vehicle is stopped for a long time and ambient air is sufficiently warm, a purge cannot be performed for a considerable amount of time after a purge. In particular, when a fuel cell current value per second is further lowered and thus a target value is not reached for several tens of seconds or more, a purge may be forcibly performed. However, there is a need for a method that makes it possible to purge even a minute amount of hydrogen in real time.

SUMMARY OF THE INVENTION

The present invention is directed to a system and a method for controlling a fuel cell.

Objectives solved by embodiments are not limited to the above-described objectives, and other objectives that are not described above may be clearly understood by those skilled in the art through the following specification.

According to an aspect of the present invention, there is provided a system for controlling a fuel cell, the system including the fuel cell, a hydrogen purge valve connected between the fuel cell and a hydrogen tank and configured to supply or cut off hydrogen to the fuel cell, and a controller configured to adjust an opening degree of the hydrogen purge valve based on an accumulated current value of the fuel cell calculated in advance and control a flow rate of the hydrogen.

The controller may include a current management unit configured to accumulate currents of the fuel cell to calculate the accumulated current value, a duty ratio calculation unit configured to calculate a duty ratio of a pulse width modulation (PWM) signal based on the calculated accumulated current value, and a valve control unit configured to generate the PWM signal having the calculated duty ratio and apply the generated PWM signal to the hydrogen purge valve to adjust the opening degree of the hydrogen purge valve.

The duty ratio calculation unit may compare the calculated accumulated current value with a preset threshold, in response to the calculated accumulated current value being found through the comparison to be greater than the preset threshold, the duty ratio calculation unit may calculate a first duty ratio of the PWM signal, and the first duty ratio may be a duty ratio of 100%.

In response to the calculated accumulated current value being found through the comparison to be less than or equal to the preset threshold, the duty ratio calculation unit may calculate a second duty ratio of the PWM signal, and the second duty ratio is a value that may be less than or equal to the first duty ratio.

The second duty ratio may be calculated through an equation represented by $100\% \times I\_req/I\_max$, wherein I_req denotes a current value required by a load stage, and I_max denotes an actual measurable maximum current value.

In response to the calculated accumulated current value being equal to or less than the preset threshold, the duty ratio calculation unit may check whether a preset threshold time has elapsed after a hydrogen purge of a previous period, and in response to the preset threshold time having elapsed, the duty ratio calculation unit may calculate the second duty ratio of the PWM signal.

In response to the threshold time not having elapsed, the duty ratio calculation unit may receive the calculated accumulated current value from the current management unit.

The valve control unit may apply the PWM signal having the first duty ratio or the second duty ratio to the hydrogen purge valve within a range of a preset opening time.

The system may further include a table storage unit configured to store a duty ratio table including an expected hydrogen discharge amount that matches each duty ratio of the PWM signal, wherein the valve control unit controls an opening time of the hydrogen purge valve based on the expected hydrogen discharge amount included in the duty ratio table.

The controller may include a current management unit configured to accumulate currents of the fuel cell to calculate the accumulated current value, a time calculation unit configured to, in response to the accumulated current value exceeding a preset threshold, calculate a purge duration of the hydrogen purge valve, and a valve control unit configured to control the opening degree and an opening time for opening the hydrogen purge valve using the calculated purge duration of the hydrogen purge valve.

According to an aspect of the present invention, there is provided a method of controlling a fuel cell, the method including accumulating, by a controller, currents of the fuel cell to calculate an accumulated current value, and adjusting, by the controller, an opening degree of a hydrogen purge valve based on the calculated accumulated current value, and controlling, by the controller, a flow rate of hydrogen.

The method may further include calculating, by the controller, a duty ratio of a PWM signal, based on the calculated accumulated current value and the controlling may include generating, by the controller, the PWM signal having the calculated duty ratio and applying, by the controller, the generated PWM signal to the hydrogen purge valve to adjust the opening degree of the hydrogen purge valve.

The calculating of the duty ratio may include comparing, by the controller, the calculated accumulated current value with a preset threshold, and in response to the accumulated current value being found through the comparison to be greater than the preset threshold, calculating, by the controller, a first duty ratio of the PWM signal, wherein the first duty ratio is a duty ratio of 100%.

The calculating of the duty ratio may include, in response to the accumulated current value being found through the comparison to be less than or equal to the preset threshold, calculating, by the controller, a second duty ratio of the PWM signal, wherein the second duty ratio is a value that is less than or equal to the first duty ratio.

The second duty ratio may be calculated through an equation represented by 100%×I_req/I_max, wherein I_req denotes a current value required by a load stage, and I_max denotes an actual measurable maximum current value.

The calculating of the duty ratio may include, in response to the accumulated current value being equal to or less than the preset threshold, checking, by the controller, whether a preset threshold time has elapsed after a hydrogen purge of a previous period, and in response to the preset threshold time having elapsed, calculating, by the controller, the second duty ratio of the PWM signal.

The calculating of the duty ratio may include, in response to the preset threshold time not having elapsed, receiving, by the controller, the accumulated current value from a current management unit presented in the controller.

The adjusting may include applying, by the controller, the PWM signal having the first duty ratio or the second duty ratio to the hydrogen purge valve within a range of a preset opening time.

The method may further include storing, by a table unit, a duty ratio table including an expected hydrogen discharge amount that matches each duty ratio of the PWM signal, wherein the adjusting includes controlling, by the controller, an opening time of the hydrogen purge valve based on the expected hydrogen discharge amount included in the duty ratio table.

The method may further include calculating, by the controller, a purge duration of the hydrogen purge valve based on the calculated accumulated current value, and the controlling may include adjusting, by the controller, the hydrogen purge valve for the calculated purge duration of the hydrogen purge valve and controlling, by the controller, the opening degree and an opening time for opening the hydrogen purge valve.

BRIEF DESCRIPTION OF THE DRAWINGS

FIG. 1 is a diagram illustrating a system for controlling a fuel cell according to an embodiment.

FIG. 2 is a diagram illustrating a detailed configuration of a controller shown in FIG. 1 according to a first embodiment.

FIGS. 3, 4A, 4B, and 5 to 8 are diagrams for comparatively describing a control principle of a hydrogen purge valve.

FIG. 9 is a diagram illustrating a method of controlling a fuel cell according to a first embodiment.

FIG. 10 is a diagram for describing a control principle of a hydrogen purge valve according a second embodiment.

FIG. 11 is a diagram illustrating a detailed configuration of a controller shown in FIG. 1 according to a second embodiment.

FIG. 12 is a diagram illustrating a method of controlling a fuel cell according to a second embodiment.

FIG. 13 is a diagram illustrating a process of controlling a hydrogen purge valve shown in FIG. 12 in detail.

FIG. 14 is a graph showing control of an opening time of a hydrogen purge valve according to an embodiment.

DETAILED DESCRIPTION OF EXEMPLARY EMBODIMENTS

Hereinafter, exemplary embodiments of the present invention will be described in detail with reference to the accompanying drawings.

However, the technical spirit of the present invention is not limited to the few embodiments disclosed below but can be implemented in various different forms. Without departing from the technical spirit of the present invention, one or more components may be selectively combined and substituted to be used between the embodiments.

Also, unless defined otherwise, terms (including technical and scientific terms) used herein may be interpreted as having the same meaning as commonly understood by one of ordinary skill in the art to which the present invention belongs. General terms like those defined in a dictionary may be interpreted in consideration of the contextual meaning of the related technology.

Furthermore, the terms used herein are intended to illustrate embodiments but are not intended to limit the present invention.

In the present specification, the terms expressed in the singular form may include the plural form unless otherwise specified. When "at least one (or one or more) of A, B, and C" is expressed, it may include one or more of all possible combinations of A, B, and C.

In addition, terms such as "first," "second," "A," "B," "(a)," and "(b)" may be used herein to describe components of the embodiments of the present invention.

The terms are not used to define an essence, order, or sequence of a corresponding component but used merely to distinguish a corresponding component from other components.

In a case in which one component is described as being "connected," "coupled," or "joined" to another component, such a description may include both a case in which the one component is "connected," "coupled," and "joined" directly to the other component and a case in which the one component is "connected," "coupled," and "joined" to the other component with still another component disposed between the one component and the other component.

In addition, in a case in which any one component is described as being formed or disposed "on (or under)" another component, such a description includes both a case in which the two components are formed in direct contact with each other and a case in which the two components are in indirect contact with each other with one or more other components interposed between the two components. In addition, in a case in which one component is described as being formed "on (or under)" another component, such a description may include a case in which the one component is formed at an upper side or a lower side with respect to the other component.

FIG. 1 is a diagram illustrating a system for controlling a fuel cell according to an embodiment, and FIG. 2 is a diagram illustrating a detailed configuration of a controller according to a first embodiment.

Referring to FIG. 1, the system for controlling a fuel cell (hereinafter referred to as a control system) according to the embodiment may include a fuel cell or fuel cell stack 10, a hydrogen cut-off valve (fuel cut-off valve (FCV)) 20, a hydrogen supply valve (fuel supply valve (FSV)) 30, a hydrogen ejector (fuel ejector (FEJ)) 40, a hydrogen purge valve (fuel purge valve (FPV)) 50, an air cut-off valve (ACV) 60, an air humidifier (AHF) 70, an air compressor (air compress pump (ACP)) 80, a controller 90, and the like.

The fuel cell 10 may include a hydrogen electrode 11, an air electrode 12, and an electrolyte interposed between the hydrogen electrode 11 and the air electrode 12. The fuel cell 10 may be implemented as any fuel cell such as a solid oxide fuel cell (SOFC) or a molten carbonate fuel cell (MCFC).

The FCV 20 may be disposed to be connected to the FSV 30. The FSV 30 may be disposed to be connected to the FEJ 40.

When the FCV 20 and the FSV 30 are opened, hydrogen discharged from a hydrogen tank may pass through the FCV 20 and the FSV 30 to move to the FEJ.

The FEJ may be disposed to be connected to the hydrogen electrode 11 and the FPV 50. Hydrogen which passes through the FEJ and is discharged may reach or pass through at least one of the hydrogen electrode 11 and the FPV 50.

The FPV 50 may be a valve for removing impurities in the fuel cell 10. The FPV 50 may perform a hydrogen purge to remove impurities. That is, when the FPV may be opened to remove nitrogen in the fuel cell 10, a flow rate of hydrogen may be changed to be decreased.

The ACV 60 may be disposed to be connected to the air electrode 12. The ACV 60 may be disposed to be connected to the AHF 70. Air passing through the ACV 60 may be supplied to the air electrode or the AHF 70. In addition, air may be supplied from the air electrode or the AHF 70 to the ACV 60.

The AHF 70 may be disposed adjacent to or connected to the ACP 80. Air passing through the ACP 80 may be supplied to the AHF 70.

The system for controlling a fuel cell may further include an air pressure control (APC) valve and the like. In a start situation or the like, the APC valve may control air pressure of an air supply system (APS) of a fuel cell system device.

In order to start a fuel cell, the APC valve may suction air and may form a high temperature state, and moist air cooled by passing through the AHF may be transferred to a stack. In this case, air that passing through the stack may pass through the ACV to return to the AHF again and may be discharged to the APC valve together with moisture.

The APV valve may be positioned between the AHF and a vent. The APV valve may have an effect of blocking the vent by closing a valve, thereby performing a function of forming pressure in a stack outlet. When there is no air resistance, as a motor in the ACP rotates at a high speed to increase pressure, air is blown into a stack inlet, thereby reducing an air residence time in the stack. This may shorten a reaction time to reduce the efficiency of the system for controlling a fuel cell. Accordingly, in the system for controlling a fuel cell of the embodiment, an opening degree of the APC is adjusted to generate back pressure for forming air pressure, thereby optimizing a reaction between hydrogen and air.

The controller 90 may control an opening degree of the FPV 50 to control a purge duration. The controller 90 may control the opening degree of the FPV 50 according to a pulse width modulation (PWM) voltage. In order to generate hydrogen pressure, an opening time may be limited to not be a certain period of time or more.

The system for controlling a fuel cell may include at least a portion of a controller for a fuel cell system described below. A fuel cell system may include a fuel cell system for a vehicle or may be applied/used to a fuel cell system for a vehicle. The system for controlling a fuel cell may include a vehicle polymer exchange membrane fuel cell (PEMFC) for a vehicle. The system for controlling a fuel cell may include at least some of all configurations used to describe the invention in the present invention or may perform at least some of all operations/functions.

The system for controlling a fuel cell may include a fuel cell system or at least a portion of a fuel cell. The system for controlling a fuel cell may include at least some of an electric circuit, an electronic circuit, a communication circuit, a processor, a semiconductor, a memory, a data transceiver, and a valve.

Referring to FIG. 2, the controller 90 according to the first embodiment may include a current management unit 91, a duty ratio calculation unit 92, a valve control unit 93, and a table storage unit 94.

The current management unit 91 may manage a current for at least a portion of the fuel cell. The current management unit 91 may calculate an accumulated current value by accumulating currents of the fuel cell.

In this case, an accumulated current value C of the fuel cell may be defined as in Equation 1 below.

$$\int I_{fuelcell} dt = C \quad \text{[Equation 1]}$$

The duty ratio calculation unit 92 may receive an accumulated current value calculated from the current management unit 91 and may calculate a duty ratio of a PWM signal based on the received accumulated current value. The duty ratio calculation unit 92 may compare the accumulated current value with a preset threshold and may calculate the duty ratio of the PWM signal according to a comparison result.

For example, when the accumulated current value is greater than the preset threshold, the duty ratio calculation unit 92 may calculate the duty ratio of the PWM signal as 100%. On the other hand, when the accumulated current value is less than or equal to the preset threshold, the duty ratio calculation unit 92 may calculate the duty ratio of the PWM signal as a value that is less than 100%.

In this case, a duty ratio D of the PWM signal may be defined as in Equation 2 below.

$$D = 100\% \times I\_req / I\_max \quad \text{[Equation 2]}$$

Here, I_req denotes a current value required by a load stage, and I_max denotes an actual measurable maximum current value.

When the accumulated current value is less than or equal to the preset threshold, the duty ratio calculation unit 92 may calculate the duty ratio of the PWM signal when a preset threshold time has elapsed after a hydrogen purge of a previous period.

When the preset threshold time has not elapsed after the hydrogen purge of the previous period, the duty ratio calculation unit 92 may continuously receive an accumulated current value over time.

The valve control unit 93 may generate a PWM signal according to the calculated duty ratio to apply the generated PWM signal to the FPV, thereby adjusting the opening degree of the FPV to control a hydrogen purge.

The table storage unit 94 may store a duty ratio table in which an expected hydrogen discharge amount matches each duty ratio of the PWM signal.

FIGS. 3 to 8 are diagrams for comparatively describing a control principle of an FPV.

Referring to FIGS. 3 to 4B, an FPV according to a comparative example may discharge hydrogen through simple opening or closing during a hydrogen purge. That is, the FPV of the comparative example may be opened for a preset time according to an accumulated current value of a fuel cell to discharge hydrogen.

FIG. 4A shows a normal output situation, that is, a case in which a hydrogen purge is performed according to an output state of a PEMFC for 31 seconds. When a time of 25 seconds has elapsed after an initial hydrogen purge, hydrogen is purged again.

FIG. 4B shows an abnormal output situation, for example, a case in which, in a state in which a vehicle is stopped for a long time and ambient air is sufficiently warm, a hydrogen purge cannot be performed for a considerable amount of time after an initial hydrogen purge.

When a fuel cell current value per second is low, and thus a target accumulated current value of a fuel cell cannot be reached for several tens of seconds or more, a hydrogen purge can be forcibly performed. However, if possible, it is preferable to purge even a minute amount of hydrogen in real time. Therefore, an embodiment is intended to provide a method of purging even a minute amount of hydrogen in real time.

To this end, in the embodiment, rather than a valve for controlling a hydrogen purge through simple opening or closing, an FPV is implemented as a valve of which an opening degree is adjustable with a minute amount of hydrogen, thereby allowing only a minute amount of hydrogen to be purged when a minute amount of output is generated.

Referring to FIGS. 5 to 8, in the FPV according to the embodiment, during a hydrogen purge, even when low power is generated by supplying hydrogen at a low flow rate, an opening degree is adjusted according to a PWM voltage, thereby securing the purity of hydrogen.

In this case, the opening degree of the FPV may be adjusted through a duty ratio of PWM. In such a method, since it is only necessary to discharge hydrogen at a low flow rate to a high flow rate, a hydrogen flow rate does not need to be accurate, and an error does not need to be adjusted with feedback.

As shown in FIG. 6, the FPV according to the embodiment may control a hydrogen discharge amount according to an opening degree while receiving constant pressure generated from a hydrogen pipe. Therefore, when a range of the opening degree of the FPV is proposed, hydrogen pressure should be specified.

As shown in FIG. 7, an opening degree of the FPV according to the embodiment may be adjusted through a duty ratio of a PWM signal according to an accumulated current value. In this case, the accumulated current value is a value proportional to a hydrogen flow rate or a hydrogen discharge amount. An expected hydrogen discharge amount according to the duty ratio of the PWM signal has a hysteresis section according to pressure. However, since precise control is not required, the expected hydrogen discharge amount can be calculated as a median value (dotted line) of a hysteresis section for each duty.

That is, since there may be a case in which, even if duty ratios of a PWM signal are different, a hydrogen discharge amount is the same, an expected hydrogen discharge amount is calculated as a median value of a hysteresis section.

Since there is a hysteresis section as described above, it is possible to generate and use a table in which an expected hydrogen discharge amount matches a median value of the hysteresis section for each duty ratio of a PWM signal.

Referring to FIG. 8, in the FPV according to the embodiment, a duty ratio of a PWM signal may be calculated every preset time to control an opening degree of the FPV using the calculated ratio of the PWM signal.

Here, an example of a case in which the duty ratio of the PWM signal is calculated every 10 seconds is shown.

As an example, when a maximum accumulated current value in which the duty ratio of the PWM signal is 100% is 3,000, and a required accumulated current value is 600, the duty ratio of the PWM signal may be calculated as 20% according to Equation 1.

As another example, when a maximum accumulated current value in which the duty ratio of the PWM signal is 100% is 3,000, and a required accumulated current value is 1,200, the duty ratio of the PWM signal may be calculated as 40% according to Equation 1.

FIG. 9 is a diagram illustrating a method of controlling a fuel cell according to a first embodiment.

Referring to FIG. 9, when a fuel cell system is turned on (S910), a system for controlling a fuel cell (hereinafter referred to as a control system) according to an embodiment may calculate an accumulated current value based on a current value of a fuel cell (S920).

The control system may compare the calculated accumulated current value with a preset threshold (S930). That is, when the accumulated current value is greater than the preset threshold, the control system may calculate a first duty ratio of a PWM signal (S940). Here, the first duty ratio may be a duty ratio of 100%.

On the other hand, when the accumulated current value is less than or equal to the preset threshold, the control system may check whether a preset threshold time has elapsed after a hydrogen purge of a previous period (S950).

That is, when the preset threshold time has elapsed, the control system may calculate a second duty ratio of the PWM signal (S960). Here, the second duty ratio may be a duty ratio of 100% or less.

On the other hand, when the preset threshold time has not elapsed, the control system may repeat the above procedure from a process of calculating the accumulated current value based on the current value of the fuel cell.

When the first duty ratio or the second duty ratio is calculated, the control system may generate the PWM signal according to the calculated first duty ratio or second duty ratio (S970).

The control system may apply the generated PWM signal having the first duty ratio or the second duty ratio to an FPV and may adjust an opening degree of the FPV to control a hydrogen purge (S980).

In this case, the control system may control a hydrogen discharge amount by controlling an opening time of the FPV based on an expected hydrogen discharge amount included in a prestored duty ratio table.

FIG. 10 is a diagram for describing a control principle of an FPV according a second embodiment.

Referring to FIG. 10, an FPV 50 may include an FPV of a PEMFC for a vehicle.

A controller 90 may control a purge duration of the FPV 50 using an accumulated current value.

The controller 90 may calculate the accumulated current value and may control the purge duration of the FPV 50 based on the calculated accumulated current value.

When the accumulated current value exceeds a threshold, the controller 90 may calculate the purge duration of the FPV 50.

When the accumulated current value exceeds the threshold, the controller 90 may control the opening of the FPV 50.

When the accumulated current value is less than the threshold, the controller may calculate a purge period of the FPV 50.

The controller 90 may control the purge duration of the FPV 50 based on the calculated purge period.

FIG. 11 is a diagram illustrating a detailed configuration of a controller according to a second embodiment.

Referring to FIG. 11, a controller 90 according to the second embodiment may include a current management unit 91 which manages a current for at least a portion of a fuel cell, a time calculation unit 92 which calculates a purge duration of an FPV, and a valve control unit 93 which controls the opening of the FPV.

The controller 90 may include at least some of the components of the above-described fuel cell system device. The controller 90 may include at least a portion of the above-described fuel cell control system.

The current management unit 91 may accumulate currents of the fuel cell to calculate an accumulated current value.

The time calculation unit 92 may calculate or count the purge period of the FPV.

The time calculation unit 92 may calculate the purge period of the FPV and then may compare the calculated accumulated current value with a preset threshold to calculate the purge duration the FPV according to a comparison result.

When the calculated accumulated current value exceeds the preset threshold, the time calculation unit 92 may calculate the purge duration of the FPV based on a purge period of a hydrogen purge.

On the other hand, when the calculated accumulated current value is less than the preset threshold, the time calculation unit 92 may repeat a procedure from a process of calculating the purge period of the FPV.

When the purge duration of the FPV is calculated, the valve control unit 93 may control an opening degree or an opening time of the FPV based on the calculated purge duration of the FPV.

FIG. 12 is a diagram illustrating a method of controlling a fuel cell according to a second embodiment.

Referring to FIG. 12, each operation of the method of controlling a fuel cell may be performed by at least some of components of a controller for a system for controlling a fuel cell.

In operation S1201, a control system may manage a current for at least a portion of a fuel cell.

In operation S1202, the control system may control an FPV based on the current.

The control system may calculate an accumulated current value and may calculate a purge duration of the FPV based on the calculated accumulated current value.

The control system may compare the calculated accumulated current value with a threshold, and when the calculated accumulated current exceeds the threshold, the control system may calculate the purge duration of the FPV.

The control system may control an opening degree or an opening time of the FPV based on the calculated purge duration.

On the other hand, when the calculated accumulated current value is less than a preset threshold, the control system may repeat a procedure from a process of calculating the purge period of the FPV.

FIG. 13 is a diagram illustrating a process of controlling an FPV shown in FIG. 12 in detail.

Referring to FIG. 13, in operation S1301, a control system may turn a fuel cell system on by a user/manager of the fuel cell system.

In operation S1302, the control system may calculate or count a purge period of an FPV using FCU or the like.

In operation S1303, the control system may calculate an accumulated current value C for at least a portion of a fuel cell through Equation 1 using FCU or the like and may compare the calculated accumulated current value with a threshold to check/determine whether the accumulated current value exceeds the threshold. Here, a preset threshold may be 3,000 but is not necessarily limited thereto.

In operation S1304, when the calculated accumulated current value exceeds the threshold, the control system may calculate a purge duration or an opening time of the FPV based on the purge duration of the FPV calculated/counted using FCU or the like and may control the FPV to be opened for the calculated purge duration and opening time of the FPV. The control system may deliver/transmit a command/signal for opening the FPV to the FPV and may deliver/transmit a command/signal for closing the FPV to the FPV after the purge duration or opening time. In addition, the control system may deliver/transmit a command/signal indicating an opening time, for which the FPV is opened, to the FPV.

When the calculated accumulated current value does not exceed the threshold (when the calculated accumulated current value is less than or equal to the threshold), the control system may repeat operations S1302 and S1303 again.

In operation S1305, in order to initialize an accumulated current value C for at least a portion of the fuel cell system, the control system may calculate/store a value obtained by subtracting the threshold (for example, 3,000) from a current accumulated current value $C_{old}$ as a new accumulated current value $C_{new}$ using FCU or the like.

Thereafter, the control system may repeat a procedure from at least some of operations S1302 to S1305 again using the calculated/stored new accumulated current value $C_{new}$. In this case, the new accumulated current value $C_{new}$ may be an initial value of the accumulated current value C.

FIG. 14 is a graph showing control of an opening time of an FPV according to an embodiment.

Referring to FIG. 14, a thick solid line indicates a valve PWM duty (%), a thin solid line indicates a valve current A, and a dotted line indicates a hydrogen discharge amount.

A control system may estimate the purity of hydrogen using an accumulated current value method or the like and may adjust an opening time of an FPV according to a slope of an accumulated current value for at least a portion of a fuel cell system.

In a section in which a purge period is short or a current for at least a portion of the fuel cell system is a high current (when a slope of an accumulated current value is greater than or equal to a preset high current reference), the control system may set a purge duration to be shorter than 0.3 seconds. In a section in which a purge period is long or a current for at least a portion of the fuel cell system is a low current (when a slope of an accumulated current value is less than or equal to a preset low current reference), the control system may set a purge duration to be longer than 0.3 seconds. In a section in which a purge period is short or a current for at least a portion of the fuel cell system is a high current, a purge duration may be 0.1 second, and in a section in which a purge period is long or a current for at least a portion of the fuel cell system is a low current, a purge duration may be 0.5 seconds.

The control system may shorten a purge duration in a high current section in which a purge period is short and may lengthen a purge duration in a low current section, thereby setting the purity of hydrogen to be in a range of about 95% or more.

In a high current section in which a slope of an accumulated current value is greater than or equal to the preset high current reference, the control system may set a purge duration to be shorter than a preset purge during reference. In a low current section in which a slope of an accumulated current value is less than or equal to the preset low current reference, the control system may set a purge duration to be longer than the preset purge during reference. The preset purge during reference may be 0.3 seconds. Values of references such as the preset low current reference, the preset high current reference, and the preset purge duration reference may be set by a user or manager of the fuel cell system, or a default value may be set by a design, but the present invention is not limited thereto.

The control system may set/or control a minimum range of a design response time of a valve to be less than 100 ms.

When a current for at least a portion of the fuel cell system is a high current, the control system may control/calculate a purge duration to be short. When a current for at least a portion of the fuel cell system is a low current, the control system may control/calculate a purge duration to be long.

The control system may set the purge duration reference to be 1%×time for a value to reach a threshold (for example, 3,000) which is a target of an accumulated current (accumulated current value/accumulated value) C. The control system may count 1% of a time of a purge period as a purge duration.

When a high current of 200 A is output from the fuel cell for 15 seconds, the control system may control the FPV to be opened for 0.15 seconds.

When a low current of 20 A is output from the fuel cell for 150 seconds, the control system may control the FPV to be opened for 1.5 seconds.

When a time from a minimum output to a maximum output of a current of a fuel cell such as a fuel cell power pack or a fuel cell system is set, the control system may vary a purge period of the FPV from 15 seconds to 150 seconds and may control a purge duration of the FPV to be in a range of 0.15 seconds to 1.5 seconds using FCU or the like.

According to embodiments, by adjusting an opening degree of an FPV through a duty ratio of a PWM signal, an appropriate hydrogen purge is performed in a low hydrogen flow rate section, thereby increasing a lifetime of a fuel cell.

Various useful advantages and effects of embodiments are not limited to the above-described effects and may be more easily understood from the description of specific embodiments of the present invention.

The term "unit" and "controller" used in the present embodiment refers to a software and/or hardware component, such as a field-programmable gate array (FPGA) or an application-specific integrated circuit (ASIC), which executes certain tasks. However, the term "unit" is not limited to a software or hardware component. A "unit" may be configured to reside in an addressable storage medium and configured to operate one or more processors. Thus, a "unit" may include, by way of example, components such as software components, object-oriented software components, class components and task components, processes, functions, attributes, procedures, subroutines, segments of program code, drivers, firmware, microcode, circuitry, data, databases, database structures, tables, arrays, and parameters. The functionality provided in the components and "units" may be combined into fewer components and "units" or further separated into additional components and units. In addition, the components and units may be implemented such that the components and "units" operate one or more central processing units (CPUs) in a device or a security multimedia card.

Although the present invention has been described with reference to the exemplary embodiments, it will be understood by those skilled in the art that various modifications and changes can be made in the present invention without departing from the spirit and scope of the present invention as defined in the appended claims.

What is claimed is:

1. A system for controlling a fuel cell, the system comprising:

the fuel cell;

a hydrogen purge valve connected between the fuel cell and a hydrogen tank and configured to supply or cut off hydrogen to the fuel cell; and a controller configured to adjust an opening degree of the hydrogen purge valve based on an accumulated current value of the fuel cell calculated in advance and control a flow rate of the hydrogen, wherein the controller includes:

a current management unit configured to accumulate currents of the fuel cell to calculate the accumulated current value;

a duty ratio calculation unit configured to calculate a duty ratio of a pulse width modulation (PWM) signal based on the calculated accumulated current value; and a valve control unit configured to generate the PWM signal having the calculated duty ratio and apply the generated PWM signal to the hydrogen purge valve to adjust the opening degree of the hydrogen purge valve.

2. The system of claim 1, wherein:

the duty ratio calculation unit compares the calculated accumulated current value with a preset threshold;

in response to the calculated accumulated current value being found through the comparison to be greater than the preset threshold, the duty ratio calculation unit calculates a first duty ratio of the PWM signal; and the first duty ratio is a duty ratio of 100%.

3. The system of claim 2, wherein:

in response to the calculated accumulated current value being found through the comparison to be less than or equal to the preset threshold, the duty ratio calculation unit calculates a second duty ratio of the PWM signal; and the second duty ratio is a value that is less than or equal to the first duty ratio.

4. The system of claim 3, wherein the second duty ratio is calculated through an equation represented by 100%×I_req/I_max, wherein:

I_req denotes a current value required by a load stage; and

I_max denotes an actual measurable maximum current value.

5. The system of claim 3, wherein:

in response to the calculated accumulated current value being equal to or less than the preset threshold, the duty ratio calculation unit checks whether a preset threshold time has elapsed after a hydrogen purge of a previous period; and in response to the preset threshold time having elapsed, the duty ratio calculation unit calculates the second duty ratio of the PWM signal.

6. The system of claim 5, wherein, in response to the preset threshold time not having elapsed, the duty ratio calculation unit receives the calculated accumulated current value from the current management unit.

7. The system of claim 5, wherein the valve control unit applies the PWM signal having the first duty ratio or the second duty ratio to the hydrogen purge valve within a range of a preset opening time.

8. The system of claim 7, further comprising a table storage unit configured to store a duty ratio table including an expected hydrogen discharge amount that matches each duty ratio of the PWM signal, wherein the valve control unit controls an opening time of the hydrogen purge valve based on the expected hydrogen discharge amount included in the duty ratio table.

9. The system of claim 1, wherein the controller includes:

a current management unit configured to accumulate currents of the fuel cell to calculate the accumulated current value;

a time calculation unit configured to, in response to the accumulated current value exceeding a preset threshold, calculate a purge duration of the hydrogen purge valve; and a valve control unit configured to control the opening degree and an opening time for opening the hydrogen purge valve using the calculated purge duration of the hydrogen purge valve.

10. A method of controlling a fuel cell, the method comprising:

accumulating, by a controller, currents of the fuel cell to calculate an accumulated current value;

calculating, by the controller, a duty ratio of a pulse width modulation (PWM) signal based on the calculated accumulated current value, adjusting, by the controller, an opening degree of a hydrogen purge valve based on the calculated accumulated current value; and controlling, by the controller, a flow rate of hydrogen, wherein the controlling includes generating, by the controller, the PWM signal having the calculated duty ratio and applying, by the controller, the generated PWM signal to the hydrogen purge valve to adjust the opening degree of the hydrogen purge valve.

11. The method of claim 10, wherein the calculating of the duty ratio includes:

comparing, by the controller, the calculated accumulated current value with a preset threshold; and in response to the accumulated current value being found through the comparison to be greater than the preset threshold, calculating, by the controller, a first duty ratio of the PWM signal, wherein the first duty ratio is a duty ratio of 100%.

12. The method of claim 11, wherein the calculating of the duty ratio includes, in response to the accumulated current value being found through the comparison to be less than or equal to the preset threshold, calculating, by the controller, a second duty ratio of the PWM signal, wherein the second duty ratio is a value that is less than or equal to the first duty ratio.

13. The method of claim 12, wherein the second duty ratio is calculated through an equation represented by 100%×I_req/I_max, wherein I_req denotes a current value required by a load stage; and I_max denotes an actual measurable maximum current value.

14. The method of claim 12, wherein the calculating of the duty ratio includes:

in response to the accumulated current value being equal to or less than the preset threshold, checking, by the controller, whether a preset threshold time has elapsed after a hydrogen purge of a previous period; and in response to the preset threshold time having elapsed, calculating, by the controller, the second duty ratio of the PWM signal.

15. The method of claim 14, wherein the calculating of the duty ratio includes, in response to the preset threshold time not having elapsed, receiving, by the controller, the accumulated current value from a current management unit present in the controller.

16. The method of claim 15, wherein the adjusting includes applying, by the controller, the PWM signal having the first duty ratio or the second duty ratio to the hydrogen purge valve within a range of a preset opening time.

17. The method of claim 16, further comprising storing, by a table unit, a duty ratio table including an expected hydrogen discharge amount that matches each duty ratio of the PWM signal, wherein the adjusting includes controlling, by the controller, an opening time of the hydrogen purge valve based on the expected hydrogen discharge amount included in the duty ratio table.

18. The method of claim 10, further comprising calculating, by the controller, a purge duration of the hydrogen purge valve based on the calculated accumulated current value, wherein the controlling includes adjusting, by the controller, the hydrogen purge valve for the calculated purge duration of the hydrogen purge valve and controlling, by the controller, the opening degree and an opening time for opening the hydrogen purge valve.

* * * * *